UNITED STATES PATENT OFFICE.

PATRICK MOLYNEAX, OF LONDON, ENGLAND.

COMPOSITION FOR LINING PETROLEUM-TANKS AND SIMILAR VESSELS.

SPECIFICATION forming part of Letters Patent No. 380,398, dated April 3, 1888.

Application filed September 6, 1887. Serial No. 248,965. (No specimens.)

*To all whom it may concern:*

Be it known that I, PATRICK MOLYNEAX, a resident of London, England, and a citizen of the United States of America, have invented a new and useful Improvement in Paint or Coating for Petroleum Tanks or Vessels and Similar Structures, of which the following is a specification.

My invention relates to a novel composition for painting or coating any structure where it is desirable to have resistance to the penetration of mineral oil and turpentine, more especially in regard to tanks of metal, wood, or concrete in which petroleum or other mineral oil or turpentine is to be stored or carried—such, for instance, as ship-tanks.

This protective composition consists of a solution in spirits of wine or other suitable solvent of shellac or other resin insoluble in petroleum, oil, or turpentine, with a small percentage of gum-arabic or other gum and sufficient glycerine to give the composition the required elasticity, to which are added magnetic oxide of iron or forge-scale, litharge or other metallic oxide, and Portland cement or other calcareo-argillaceous material or substances for giving body and durability to the coating or composition.

The substances which I prefer to use in preparing the composition for the lining of tanks or other vessels, the manner in which they are mixed, and the proportions employed are as follows; but the proportions may advantageously be varied with the circumstances under which the composition is to be employed:

In order to form my composition I take powdered iron, forge-scale, and Portland cement in equal proportions, by weight, forming, for convenience of description, say, one and one-half pound together; or another suitable combination for giving body and durability to the coating is composed of dry litharge, forge-scale, and Portland cement in equal proportions, together with two per cent. of powdered glass, forming, say, one and one-half pound together. To one or the other, or other suitable body and durability creating substance, I add a strong solution of gum-lac in spirits of wine or other suitable solvent, one-half pound of lac to one pint of spirits being suitable, together with two per cent. of glycerine and five per cent. of gum-arabic. I then mix the whole intimately together, and the paint or coating is applied in the usual way to the surface to be protected.

Having now particularly described and ascertained the nature of my said invention and in what manner the same is to be performed, I declare that I do not limit myself to the use of the particular resin, gum, solvent, metallic oxide, or calcareo-argillaceous material specified; but

What I claim is—

An oil-proof paint or coating for tanks and similar vessels, consisting of a resin, as shellac, insoluble in petroleum, oil, or turpentine, a solvent suitable to said resin, and small percentages of a gum, as gum-arabic, and of glycerine, together with a mixture of metallic oxide and calcareo-argillaceous material, substantially as hereinbefore specified.

In testimony whereof I have signed my name to this specification in the presence of two subscribing witnesses.

PATRICK MOLYNEAX.

Witnesses:
SAM. P. WILDING,
EDWARD J. WHITEHURST.